US011325568B2

(12) United States Patent
Kraemer

(10) Patent No.: US 11,325,568 B2
(45) Date of Patent: May 10, 2022

(54) WIPER BLADE DEVICE

(71) Applicant: Robert Bosch GmbH, Stuttgart (DE)

(72) Inventor: Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/954,578

(22) PCT Filed: Oct. 11, 2018

(86) PCT No.: PCT/EP2018/077694
§ 371 (c)(1),
(2) Date: Jun. 17, 2020

(87) PCT Pub. No.: WO2019/120670
PCT Pub. Date: Jun. 27, 2019

(65) Prior Publication Data
US 2020/0331437 A1    Oct. 22, 2020

(30) Foreign Application Priority Data

Dec. 21, 2017 (DE) ..................... 10 2017 223 518.7

(51) Int. Cl.
*B60S 1/52* (2006.01)
*B60S 1/38* (2006.01)
*B60S 1/40* (2006.01)

(52) U.S. Cl.
CPC ............. *B60S 1/524* (2013.01); *B60S 1/3862* (2013.01); *B60S 1/4083* (2013.01)

(58) Field of Classification Search
CPC ....... B60S 1/524; B60S 1/3862; B60S 1/4083
See application file for complete search history.

(56) References Cited

U.S. PATENT DOCUMENTS 10,035,495 B2    7/2018  Schaeuble
2011/0185531 A1  8/2011  Egner-Walter et al.
(Continued)

FOREIGN PATENT DOCUMENTS

DE    102007062304    6/2009
DE    102010025687    1/2012
(Continued)

OTHER PUBLICATIONS

International Search Report for Application No. PCT/EP2018/077694 dated Feb. 1, 2019 (English Translation, 3 pages).

*Primary Examiner* — Andrew A Horton
(74) *Attorney, Agent, or Firm* — Michael Best & Friedrich LLP

(57) ABSTRACT

The invention relates to a wiper blade device, in particular a windscreen wiper blade device, comprising: at least one wiper blade (10); at least one adapter unit (12) for coupling the wiper blade (10) to a wiper arm (14) of a wiper (16), in particular a windscreen wiper; at least one spraying unit (18) integrated in the wiper blade (10); and at least one washing water distributor unit (20) for supplying washing water to the spraying unit (18), in particular to nozzle elements (22) of the spraying unit (18) which are arranged substantially parallel to a main extension direction (54) of the wiper blade (10) along the wiper blade (10), wherein the washing water distributor unit (20) has at least one channel coupling element (24) for coupling at least one portion of the washing water distributor unit (20) to a washing water channel (26) of the spraying unit (18), the coupling being provided in particular for passage of a fluid and being preferably fluid-tight, and wherein the washing water distributor unit (20) has at least one adapter coupling element (28) for coupling at least one additional portion of the washing water distributor unit (20) to an additional washing water channel (30) of the adapter unit (12), the coupling being provided in par- (Continued)

ticular for passage of a fluid and being preferably fluid-tight. According to the invention, the additional washing water channel (30) is formed at least in part by the adapter unit (12).

22 Claims, 4 Drawing Sheets

(56) References Cited

U.S. PATENT DOCUMENTS

| | | |
|---|---|---|
| 2013/0269140 A1* | 10/2013 | Egner-Walter ........ B60S 1/3862 |
| | | 15/250.04 |
| 2013/0291328 A1 | 11/2013 | Schmid |
| 2014/0026348 A1 | 1/2014 | Schaeuble |
| 2016/0129887 A1 | 5/2016 | Schaeuble |
| 2017/0008495 A1* | 1/2017 | Shimoyama .......... B60S 1/3862 |

FOREIGN PATENT DOCUMENTS

| | | |
|---|---|---|
| DE | 102010052309 A1 | 5/2012 |
| DE | 112011102653 | 8/2013 |
| DE | 102013103279 | 10/2014 |
| DE | 102014009721 | 8/2015 |
| DE | 102014111568 | 2/2016 |
| DE | 102014114691 | 4/2016 |
| DE | 102015109342 | 12/2016 |
| EP | 2460700 | 6/2012 |
| EP | 2505440 | 10/2012 |
| GB | 1334507 A * | 10/1973 ................ B60S 1/38 |

\* cited by examiner

WIPER BLADE DEVICE

BACKGROUND OF THE INVENTION

The invention relates to wiper blades.

There has already been proposed a wiper blade device, in particular a wiper blade device for a windshield wiper, having at least one wiper blade, having at least one adapter unit for coupling the wiper blade to a wiper arm of a wiper, in particular windshield wiper, having at least one spray unit which is integrated in the wiper blade, and having at least one washing water distributor unit for supplying washing water to the spray unit, in particular to nozzle elements of the spray unit which are arranged at least substantially parallel with a main extent direction of the wiper blade along the wiper blade, wherein the washing water distributor unit has at least one channel coupling element for a preferably fluid-tight coupling of at least one component of the washing water distributor unit to a washing water channel of the spray unit, which coupling is provided in particular for a passage of a fluid, and wherein the washing water distributor unit has at least one adapter coupling element for a preferably fluid-tight coupling of at least one additional component of the washing water distributor unit to an additional washing water channel of the adapter unit, which coupling is provided in particular for a passage of a fluid.

SUMMARY OF THE INVENTION

The invention is based on a wiper blade device, in particular a wiper blade device for a windshield wiper, having at least one wiper blade, having at least one adapter unit for coupling the wiper blade to a wiper arm of a wiper, in particular windshield wiper, having at least one spray unit which is integrated in the wiper blade, and having at least one washing water distributor unit for supplying washing water to the spray unit, in particular to nozzle elements of the spray unit which are arranged substantially parallel with a main extent direction of the wiper blade along the wiper blade, wherein the washing water distributor unit has at least one channel coupling element for a preferably fluid-tight coupling of at least one component of the washing water distributor unit to a washing water channel of the spray unit, which coupling is provided in particular for a passage of a fluid, and wherein the washing water distributor unit has at least one adapter coupling element for a preferably fluid-tight coupling of at least one additional component of the washing water distributor unit to an additional washing water channel of the adapter unit, which coupling is provided in particular for a passage of a fluid.

It is proposed that the additional washing water channel be at least partially formed by the adapter unit. As a result of the configuration of the wiper blade device according to the invention, a wiper blade device with advantageous cleaning properties can advantageously be achieved. In particular, an advantageous supply and/or distribution of washing water, in particular to a spray unit of a wiper blade, can be enabled, whereby particularly effective cleaning of a pane which is processed by the wiper blade can be enabled. In addition, as a result of the configuration of the wiper blade device according to the invention, a high level of sealing of the washing water distributor unit can advantageously be achieved. Furthermore, assembly, in particular of a wiper blade with a spray unit, can advantageously be facilitated, in particular by at least one washing water channel, preferably the majority of all washing water channels, being constructed without pipes. In addition, particularly as a result of an in particular integral construction of an additional washing water channel as a fixed component of the adapter unit, complexity can advantageously be reduced, in particular by reducing the overall number of components, whereby in particular production and/or assembly costs can be reduced.

A "wiper blade device" is intended to be understood in particular to be at least one component, in particular a sub-assembly, of a wiper blade, wherein, in particular in addition, accessory units for the wiper blade may also be included, such as, for example, a spray unit, at least one washing water channel, at least one component of a washing water distributor unit and/or at least one component of an adapter unit. In particular, the wiper blade device may also comprise the entire wiper blade, in particular with the adapter unit. The "adapter unit" is intended in particular to be understood to be a unit which is provided to produce a coupling of the wiper blade to at least one wiper arm. In particular, the adapter unit comprises at least one wiper arm adapter. The term "provided" is intended to be understood to mean in particular specifically programmed, configured and/or equipped. The fact that an object is provided for a specific function is intended in particular to be understood to mean that the object performs and/or carries out this specific function in at least one application and/or operating state.

A "wiper arm adapter" is intended in this context to be understood to be in particular an adapter which provides an assembly position for assembly of a wiper arm with the adapter unit. In particular, the wiper arm adapter has at least one wiper arm receiving member for at least partially receiving at least a portion of the wiper arm. In particular, a connection which is produced by means of the wiper arm adapter between the wiper arm and the adapter unit can be released. It is, for example, conceivable for the adapter unit to have an actuation element, for example, a button, by means of which a connection of the wiper arm adapter can be released without being destroyed. The wiper arm adapter particularly cannot be released from the adapter unit without being destroyed. In addition, the adapter unit may in particular have a wiper blade adapter. A "wiper blade adapter" is intended in this context in particular to be understood to be an adapter which has a contact region with respect to a wiper blade component and which is connected to the wiper blade component in a non-releasable manner. Preferably, the wiper blade is connected to the wiper blade adapter in a secure manner which preferably cannot be released without being destroyed. A simple assembly of the wiper blade and wiper arm can thereby advantageously be enabled. In particular, the wiper blade adapter and the wiper arm adapter are connected in the adapter unit by means of a retention spring.

In particular, the wiper blade adapter and the wiper arm adapter are supported so as to be able to be moved relative to each other, in particular at least partially rotated. Preferably, using the adapter unit, the wiper blade is supported so as to be able to be at least partially rotated with respect to the wiper arm. The term "so as to be able to be at least partially rotated" is intended in particular to be understood to be rotatable through a maximum rotation angle of at least 5°, preferably at least 10°, advantageously at least 12°, preferably at least 15° and in a particularly preferred manner a maximum of 20°. In particular, the wiper blade can be rotated with respect to an idle position in a clockwise direction and/or counter-clockwise direction, wherein preferably one of the rotation directions has a rotation freedom which is greater, in particular at least four times, preferably at least five times, preferably at least six times and in a particularly preferred manner at least seven times greater, that is to say, the maximum possible rotation angle in one of the rotation directions is correspondingly greater. In particular, the wiper blade can be rotated about a rotation axis which extends perpendicularly to a main extent direction of the wiper blade and parallel with a wiping plane of the wiper blade. A "main extent direction" of an object is intended in particular to be understood to be a direction which extends parallel with a longest edge of a smallest geometric parallelepiped which still just completely surrounds the object. A "wiping plane" is intended in particular to be understood to be a plane which is traveled over during wiping operation of the wiper by a lower side of the wiper blade, in particular a wiper lip. In particular, the rotation of the wiper blade with respect to the wiper arm in at least one rotation direction is limited by a stop which in particular is arranged on the retention spring, on the wiper arm adapter and/or on the wiper blade adapter. In particular, the retention spring is provided for directing a redirected wiper blade back into a starting and/or idle position.

A "spray unit" is in this context in particular intended to be understood to be a unit which comprises at least one nozzle element. Preferably, the spray unit comprises at least two nozzle elements, which are arranged in particular in a row. In a particularly preferred manner, the nozzle elements are arranged laterally on one or on both long side(s) of a wiper strip of the wiper blade. A "nozzle element" is in this context in particular intended to be understood to be an element which is provided to discharge washing water, in particular onto a windshield, or to spray it in a specific direction. In particular, the nozzle element has at least one nozzle opening which opens a washing water system toward the environment. The nozzle element may be produced from a metal and/or in a particularly advantageous manner from a plastics material. Preferably, the nozzle element is provided to be coupled to a washing water channel of the spray unit. The fact that the spray unit is "integrated in the wiper blade" is intended in particular to be understood to mean that the components of the spray unit, in particular the nozzle elements, are connected to the wiper blade in a non-releasable manner, in particular they cannot be separated from the wiper blade without being destroyed. In particular, the nozzle elements are constructed as openings which are arranged in a state distributed along the wiper blade at least partially in a uniform and/or non-uniform manner and which are orientated in particular at least obliquely in the direction of a wiping plane of the wiper blade. Alternatively or additionally, it is also conceivable for at least one additional nozzle element to be arranged outside the wiper blade, for example, in the adapter unit and/or in an end cap of the wiper blade.

A "washing water distributor unit" is in particular intended to be understood to be a unit which directs washing water supplied to the wiper blade device at least partially through the adapter unit and/or wiper blade to the spray unit. In particular, the washing water distributor unit divides the supplied washing water in such a manner that, during a spraying operation of the spray unit, comparable washing water pressures occur at selected and/or at all nozzle elements. It is thereby advantageously possible to achieve a good and/or uniform cleaning power. In particular, the washing water distributor unit has at least one washing water supply for connection to an external washing water source. In particular, the washing water distributor unit has at least one, preferably two, washing water outlets, which can be connected, for example, to washing water channels of the spray unit. Preferably, two washing water outlets are orientated at least substantially in opposing directions parallel with the main extent direction of the wiper blade. In particular, washing water supply lines and washing water drainage lines are orientated at least substantially parallel with each other, in particular when viewed in a projection onto the wiping plane.

A "channel coupling element" is intended in particular to be understood to be an element of the washing water distributor unit which is provided to form a water-tight, in particular non-positive-locking and/or positive-locking connection of a washing-water-carrying washing water channel of the spray unit to a component of the washing water distributor unit. In particular, the channel coupling element may be provided to form an in particular tension-resistant pipe coupling. In particular, the channel coupling element may comprise at least one positive-locking element which is preferably formed as an edge which may be provided to engage at least partially in a recess of the washing water channel of the spray unit. The term "non-positive-locking and/or positive locking connection" is intended in particular to be understood to be a releasable connection, wherein a retention force is transmitted between two components, preferably by means of a geometric engagement of the components inside each other and/or a frictional force between the components. The channel coupling element is in particular formed from an at least substantially dimensionally stable material, for example, a plastics material and/or a metal. The washing water channel of the spray unit may in particular be constructed at least partially as a hose and/or at least partially as a hollow space in the wiper blade.

An "adapter coupling element" is intended in particular to be understood to be an element of the washing water distributor unit which is provided for water-tight, in particular non-positive-locking and/or positive-locking connection of an additional washing-water-carrying washing water channel of the adapter unit to a portion of the washing water distributor unit. In particular, the adapter coupling element may be provided to form a pipe coupling. In particular, the adapter coupling element may be connected by means of at least one positive-locking element in a non-positive-locking and/or positive-locking manner to the adapter unit, in particular the wiper arm adapter, preferably in a fluid-tight manner to a recess in the wiper arm adapter. Preferably, the adapter coupling element has at a coupling location provided for coupling to the adapter unit a seal, in particular a sealing edge, by means of which the adapter coupling element can be connected in a fluid-tight manner to the additional washing water channel of the adapter unit. Alternatively or additionally, the seal may also comprise a sealing ring, for example, an O-ring, and/or another seal commonly known to the person skilled in the art. The additional washing water channel of the adapter unit is in particular constructed as a hollow space in the adapter unit, in particular of the wiper arm adapter. The adapter coupling element is in particular provided to engage at least partially in the hollow space of the adapter unit, in particular the wiper arm adapter. Preferably, the adapter coupling element which is connected to the adapter unit is fixed in position relative to a component of the adapter unit, in particular the wiper arm adapter. A position of the adapter coupling element is in particular not influenced by a relative movement of the wiper blade with respect to the wiper arm adapter. An outer shape of the adapter coupling element is in particular at least partially adapted to a shape of the hollow space of the adapter unit, in particular the wiper arm adapter, and has in particular a cross-section which complements a cross-section of the hollow space of the adapter unit, in particular the wiper arm adapter. The additional washing water channel of the adapter unit has in particular rigid and/or stiff walls. The wiper arm adapter is preferably constructed as an injection-molded component having hollow-space-like channels to form a washing water guide, in particular the additional washing water channel and a washing water supply line channel.

The fact that the additional washing water channel of the adapter unit is intended to be at least "partially constructed by the adapter unit" is intended in particular to be understood to mean that at least 60%, preferably at least 80%, preferably at least 85% and in a particularly preferred manner at least 95% of the elements which delimit the additional washing water channel, in particular walls, are constructed integrally with the adapter unit, in particular with the wiper arm adapter of the adapter unit. The additional washing water channel of the adapter unit is in particular constructed without hoses. It is thereby advantageously possible to prevent any need for an introduction and/or removal and/or a location and/or dislocation of components which carry washing water during assembly and/or disassembly.

It is further proposed that the adapter unit in a mounted state be connected to the wiper blade at least substantially in a non-detachable manner, in particular at least substantially in a non-releasable manner. Complexity can thereby advantageously be reduced. In particular, an assembly and/or a replacement of a wiper blade on a wiper arm can be facilitated. It is thereby advantageously possible to reduce costs, in particular for an end client who is having a wiper blade changed. The term "at least substantially non-releasable" is intended in this instance to be understood in particular to be a connection of at least two elements which can be separated from each other only using separation tools, such as, for example, a saw, in particular a mechanical saw, etcetera, and/or chemical separation agents, such as, for example, solvents, etcetera. In particular non-releasable elements cannot be separated from each other without being destroyed. In particular, the wiper blade adapter is connected to the wiper blade in an at least substantially non-detachable, in particular at least substantially non-releasable manner. In particular, the wiper blade adapter is connected to the wiper arm adapter and/or to the retention spring in an at least substantially non-detachable, in particular at least substantially non-releasable manner. In particular, the wiper arm adapter can be releasably connected to the wiper arm in a non-destructive manner.

In addition, it is proposed that the washing water distributor unit have a washing water supply line channel which is formed integrally with the adapter unit, in particular the wiper arm adapter of the adapter unit, and which is arranged in an angled manner, in particular at least substantially perpendicularly to the additional washing water channel of the adapter unit. It is thereby advantageously possible to achieve a wiper blade device with advantageous cleaning properties. In particular, a particularly space-saving arrangement of the washing water distributor unit can advantageously be enabled, whereby, for example, good flow properties, such as, for example, a low air-resistance against a travel wind which flows against the wiper blade device, can be achieved. The washing water supply line channel is in particular constructed as an elongate recess in the wiper arm adapter which is walled in the peripheral direction and which is connected via an opening to the additional washing water channel. In particular, the additional washing water channel of the adapter unit, in particular a main extent direction of the additional washing water channel of the adapter unit, in the mounted, in particular unmoved, state is orientated at least substantially perpendicularly to the wiper blade, in particular to the main extent direction of the wiper blade. In particular, the additional washing water channel of the adapter unit, in particular a main extent direction of the additional washing water channel of the adapter unit, is orientated at least substantially perpendicularly to the washing water supply line channel, in particular to a main extent direction of the washing water supply line channel. In particular, the additional washing water channel of the adapter unit and/or the washing water supply line channel, in particular a main extent direction of the additional washing water channel of the adapter unit and/or the washing water supply line channel, in the assembled state is orientated at least substantially perpendicularly to the rotation axis of the wiper blade. The expression "substantially perpendicularly" is intended in this instance in particular to define an orientation of a direction relative to a reference direction, wherein the direction and the reference direction, in particular when viewed in a plane, form an angle of 90° and the angle has a maximum deviation of in particular less than 8°, advantageously less than 5° and in a particularly advantageous manner less than 2°. The term "integral" is intended in particular to be understood to mean connected in a materially engaging manner, such as, for example, by means of a welding process and/or adhesive process, etcetera, and in a particularly advantageous manner formed on, as by the production from a casting and/or the production in a single or multiple-component injection method. Advantageously, the term integral is also intended to be understood to mean in one piece. The term "in one piece" is intended in particular to be understood to mean formed in one piece. Preferably, this one piece is produced from a single blank, a mass and/or a casting, in a particularly preferred manner with an injection-molding method, in particular a single and/or multiple-component injection-molding method.

It is further proposed that the channel coupling element and the adapter coupling element be connected by means of at least one at least partially flexible washing water line, in particular in a fluid-conducting and/or fluid-tight manner. Flexibility can thereby advantageously be increased. In particular, a rotatability of the wiper blade with respect to the wiper arm and/or the wiper arm adapter can advantageously be achieved and is particularly fluid-tight. The term "partially flexible" is in particular intended to be understood to mean at least 50%, preferably at least 75% and preferably at least 90% flexible. The at least partially flexible washing water line is in particular at least partially constructed from a flexible and/or resiliently deformable material, for example, a rubber. In particular, the flexible washing water line may be constructed as a rubber-hose-like element, which is constructed separately from the channel coupling element and/or the adapter coupling element and/or at least partially integrally with the channel coupling element and/or the adapter coupling element. The term "connected in a fluid-conducting manner" is in particular intended to be understood to mean forming a common fluid channel.

Furthermore, it is proposed that the adapter coupling element be coupled to at least one additional flexible washing water line, in particular in a fluid-conducting and/or fluid-tight manner. Flexibility can thereby advantageously be further increased. In particular, washing water can advantageously be distributed over a large region. The at least one additional flexible washing water line is preferably constructed to be at least substantially identical to the flexible washing water line. In particular, the flexible washing water line may be constructed as a rubber-hose-like element which is constructed separately from the channel coupling element, the adapter coupling element and/or the flexible washing water line and/or at least partially integrally with the channel coupling element, the adapter coupling element and/or the flexible washing water line.

It is further proposed that the adapter coupling element have a sealing element, in particular a sealing edge, to form a water-tight coupling at least with the additional washing water channel of the adapter unit. It is thereby advantageously possible to achieve good sealing of the washing-water-carrying elements, in particular after a connection of the wiper arm and wiper blade, whereby a high level of operational reliability can advantageously be achieved. The sealing element, in particular the sealing edge, of the adapter coupling element is constructed as a tapering of a coupling region of the adapter coupling element relative to the additional washing water channel of the adapter unit. The sealing element, in particular the sealing edge, of the adapter coupling element is in particular constructed at least substantially in a mushroom-like manner. Alternatively or additionally, the sealing element of the adapter coupling element may comprise additional seals, such as rubber seals or other seals commonly known to the person skilled in the art. In particular, the additional washing water channel of the adapter unit has a narrowing. The narrowing of the additional washing water channel is in particular adapted to the sealing element, in particular the sealing edge, of the adapter coupling element or constructed so as to at least partially complement the sealing element, in particular the sealing edge, of the adapter coupling element. A compression of the narrowing and the sealing element, in particular the sealing edge, of the adapter coupling element leads in particular to a water-tight connection of the adapter coupling element to the additional washing water channel.

In addition, it is proposed that the adapter coupling element have a locking device for positioning the adapter coupling element relative to the adapter unit. A simple assembly can thereby advantageously be enabled. The locking device is in particular constructed as an arrangement of mutually engaging locking elements which are constructed in particular by the adapter coupling element and/or the adapter unit, preferably the wiper arm adapter. The locking elements are preferably constructed as locking hooks. Alternatively or additionally, the locking device may also comprise alternative fixings, for example, screw connections and/or adhesive connections.

It is further proposed that the locking device, in particular at least one locking element of the locking device, be provided for fixing the adapter coupling element in the additional washing water channel of the adapter unit. It is thereby advantageously possible to enable good anti-freezing protection, in particular by the adapter coupling element being able to be prevented from being pressed out of the additional washing water channel in the event of freezing of the washing water in the washing water distributor unit. A high level of operational reliability can thereby advantageously be achieved. Preferably, locking elements of the locking device prevent a movement of the adapter coupling element relative to the adapter unit, in particular in an insertion direction of the adapter coupling element in the additional washing water channel of the adapter unit.

It is further proposed that the adapter unit have a wiper arm adapter for coupling to a wiper arm of a wiper, in particular windshield wiper, which is connected to the adapter coupling element in a rotationally secure manner. It is thereby advantageously possible to enable a water-tight rotatable coupling of the wiper blade and wiper arm which in particular is constructed in a particularly simple manner. Advantageously, rotation-enabling components are arranged completely in a component, in particular the wiper blade which contains the adapter unit, whereby in particular an assembly and/or disassembly can be simplified. In particular, the assembly and/or disassembly can take place without any removal and/or introduction operations and/or dislocation and/or location operations. The term "connected in a rotationally secure manner" is intended in particular to be understood to be a connection, by means of which two components can be positioned relative to each other in such a manner that relative movements of the two components are excluded during normal operation and/or normal use.

It is further proposed that the adapter unit have a wiper arm adapter for coupling to a wiper arm of a wiper, in particular windshield wiper, wherein the at least one channel coupling element can be moved relative to the wiper arm adapter. In particular, the at least one channel coupling element can be moved relative to the wiper arm adapter in a rotational manner about the rotation axis. It is thereby advantageously possible to enable a water-tight, rotatable coupling of the wiper blade and wiper arm which in particular is constructed in a particularly simple manner. Advantageously, rotation-enabling components are arranged completely in a component, in particular the wiper blade which contains the adapter unit, whereby in particular assembly and/or disassembly can be simplified. In particular, assembly and/or disassembly can take place without any removal and/or introduction operations and/or dislocation and/or location operations. In particular, an additional channel coupling element of the washing water distributor unit may be able to be moved in accordance with and/or independently of the at least one channel coupling element. In particular, the channel coupling element can be moved relative to the adapter coupling element. In particular, a rotation and/or movement of the channel coupling element relative to the adapter coupling element and/or relative to the wiper arm adapter brings about a resilient deformation of the flexible washing water line.

In addition, it is proposed that the channel coupling element, the adapter coupling element, the flexible washing water line, the additional flexible washing water line and/or an additional channel coupling element of the washing water distributor unit be constructed as an integral washing water distributor element of the washing water distributor unit. It is thereby advantageously possible for complexity to be reduced, in particular by a total number of components being able to be reduced. In addition, the service-life can advantageously be increased, in particular by couplings and/or connection elements which are subject to wear and/or failure being able to be dispensed with.

If the washing water distributor element is constructed as a multi-colored injection-molded component, production costs and/or unit costs can advantageously be kept low which in particular with a wear component such as a wiper blade, which has to be regularly replaced, is a significant consideration. In particular, the washing water distributor element is constructed as a two-color injection-molded component, wherein the channel coupling elements and the adapter coupling element are constructed at least partially, in particular primarily, from a dimensionally stable material and the flexible washing water lines are constructed at least partially, in particular primarily, from a flexible, for example, rubber-like material.

It is further proposed that the washing water distributor unit have an, in particular hose-free, rapid coupling device for a fluid-tight coupling of the washing water distributor unit to an external washing water supply line. A simple and/or rapid assembly and/or disassembly can thereby advantageously be enabled, whereby in particular assembly and/or replacement costs can be kept low. In addition, complexity can advantageously be reduced. The rapid coupling device is constructed at least partially integrally with the adapter unit, in particular the wiper arm adapter of the adapter unit. The external washing water supply line is in particular constructed as a rigid supply line pipe, which is arranged in particular on the wiper arm. The rapid coupling device advantageously enables a fluid-tight connection of the washing water distributor unit to a washing water supply line of a wiper arm, which connection in particular is free from introduction, removal, location, dislocation and/or bending operations and is free from rotational movements and/or screw connections. The rapid coupling device comprises in particular a connection element to form a non-positive-locking and/or positive-locking connection of the wiper arm to the wiper arm adapter, for example, a clip-fit connection to clip-fit a wiper arm into the wiper arm adapter. Preferably, clip-fitting the wiper arm into the wiper arm adapter to form a simultaneous fluid-tight closure of the washing-water-carrying components of the wiper arm and wiper arm adapter. Preferably, the rapid coupling device comprises an unlocking element, for example, an unlocking button, by means of which a connection between the wiper arm and wiper blade and/or between the washing water distributor unit and the external supply line can be released.

In addition, it is proposed that the rapid coupling device have at least one receiving channel for receiving an, in particular rigid and/or tubular, external washing water supply line of a wiper arm of a wiper, in particular windshield wiper. It is thereby advantageously possible to achieve simple handling, in particular by a water-tight connection between the wiper arm and wiper blade being able to be produced by means of a simple sliding movement. The receiving channel is in particular identical to the washing water supply line channel of the wiper arm adapter.

If the receiving channel has at least one inclined introduction member, a simple, rapid and/or reliable assembly can advantageously be achieved, in particular by the external washing water supply line being able to be independently guided into a correct end position. It is thereby advantageously possible to ensure a water-tight, washing-water-carrying connection between the wiper arm and the wiper blade. In particular, the receiving channel forms an assembly rail to support assembly of the wiper blade with the wiper arm. An assembly of the wiper blade device according to the invention, in particular the wiper blade for the windshield wiper, advantageously thereby resembles a conventional assembly method for wiper blades, whereby occurrences of incorrect assembly can advantageously be prevented.

Advantageously, with a coupling by means of the rapid coupling device, the receiving channel can be connected to the external washing water supply line in a water-tight manner by means of a sealing element, in particular a sealing edge, of the external washing water supply line. In particular, a good sealing of the washing-water-guiding elements, in particular after a connection of the wiper arm and wiper blade, can thereby be achieved, whereby a high level of operational reliability can advantageously be achieved. The sealing element, in particular the sealing edge, of the external washing water supply line is in particular constructed as a tapering of the external washing water supply line, in particular in an outer end region of the external washing water supply line. The sealing element, in particular the sealing edge, of the external washing water supply line is in particular constructed at least substantially in a mushroom-like manner. Alternatively or additionally, the sealing element of the external washing water supply line may comprise additional seals, such as rubber seals, or additional seals commonly known to the person skilled in the art. In particular, the receiving channel has a narrowing, preferably in an inner end region of the receiving channel and/or in the vicinity of the transition and/or the opening from the receiving channel to the additional washing water channel. The narrowing of the receiving channel is in particular adapted to the tapering of the external washing water supply line or constructed so as to at least partially complement the tapering of the external washing water supply line. A compression of an end region of the external washing water supply line with the sealing element, in particular the sealing edge, of the external washing water supply line leads in particular to a water-tight connection of the external washing water supply line to the receiving channel and/or the additional washing water channel.

In addition, it is proposed that the adapter unit have a wiper arm adapter for coupling to a wiper arm of a wiper, in particular windshield wiper, which comprises a clip-fit connection for connection to the wiper arm, wherein the clip-fit connection is provided to predetermine an introduction depth for an external washing water supply line of the wiper arm in the receiving channel. It is thereby advantageously possible to enable simple handling, in particular simple and reliable assembly. In particular, an assembly of the wiper arm and wiper blade can be carried out without any particular complexity for production of a washing water connection, in particular since a connection and sealing take place automatically together with a clip-fitting of the wiper arm in the clip-fit connection. A clip-fit connection is constructed in particular as an at least positive-locking connection. With a connection by means of the clip-fit connection, the wiper arm and wiper arm adapter engage at least partially in each other and are fixed relative to each other by means of locking. The connection between the external washing water supply line and the additional washing water channel and/or the receiving channel is preferably free from locking connection elements. In particular, the connection between the external washing water supply line and the additional washing water channel and/or the receiving channel is retained by means of the clip-fit connection of the wiper arm to the wiper arm adapter.

Furthermore, a wiper, in particular windshield wiper, having a wiper blade device is proposed. A wiper with advantageous cleaning properties can thereby advantageously be achieved.

The wiper blade device according to the invention is not intended to be limited to the above-described application and embodiment in this instance. In particular, the wiper blade device according to the invention in order to carry out an operating method described herein may have a number of individual elements, components and units different from the number mentioned herein. In addition, in the value ranges set out in this disclosure, values which are within the mentioned limits should also be considered to be disclosed and freely usable.

BRIEF DESCRIPTION OF THE DRAWINGS

Other advantages will be appreciated from the following description of the drawings. The drawings illustrate an embodiment of the invention. The drawings, the description and the claims contain numerous features in combination. The person skilled in the art will also advantageously consider the features individually and combine them to form advantageous additional combinations.

In the drawings.

DETAILED DESCRIPTION

Figure 1:
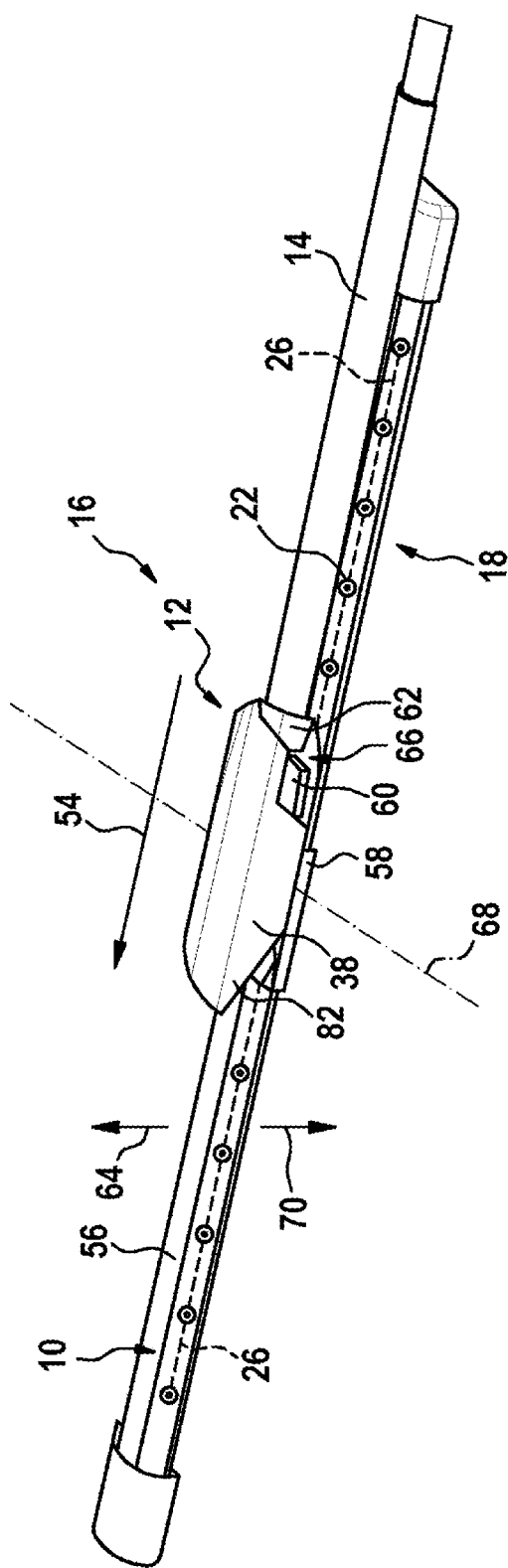
FIG. 1 is a schematic, perspective view of a wiper having a wiper arm and a wiper blade device.

FIG. 1 shows a wiper 16 with a wiper arm 14 and a wiper blade device. The wiper blade device has a wiper blade 10. The wiper blade 10 has a main extent direction 54. The wiper blade 10 has a wiper blade strip 56.

The wiper blade device has a spray unit 18. The spray unit 18 is provided for spraying washing water. The spray unit 18 is integrated in the wiper blade 10. The spray unit 18 has nozzle elements 22. The nozzle elements 22 are constructed as outlet openings, from which washing water can be discharged when the spray unit 18 is activated. The nozzle elements 22 are arranged in the main extent direction 54 of the wiper blade 10 along the wiper blade 10. The nozzle elements 22 are spaced apart from each other at least substantially in a regular manner.

The wiper blade device has an adapter unit 12. The adapter unit 12 is provided for coupling the wiper blade 10 to a wiper arm 14 of the wiper 16. In a mounted state, the adapter unit 12 is connected to the wiper blade 10 in a non-detachable manner. In the mounted state, the adapter unit 12 is connected to the wiper blade 10 in a non-releasable manner. The adapter unit 12 has a wiper blade adapter 58. The wiper blade adapter 58 is coupled to the wiper blade 10 in a non-releasable manner. The adapter unit 12 has a wiper arm adapter 38. The wiper arm adapter 38 is releasably coupled to the wiper arm 14. The wiper arm adapter 38 is provided for coupling the adapter unit 12 to the wiper arm 14 of the wiper 16. The adapter unit 12 has a retention spring 66. The retention spring 66 is coupled to the wiper arm adapter 38 in a non-releasable manner. The retention spring 66 is coupled to the wiper blade adapter 58 in a non-releasable manner. The retention spring 66 enables a rotational redirection of the wiper blade 10 relative to the wiper arm 14 and/or the wiper arm adapter 38 about a rotation axis 36. The wiper blade 10 may at a side facing away from the wiper arm 14 in the state mounted relative to the wiper 16 be pivoted in a direction 64 facing away from a wiper lip 72 (cf. FIG. 2) of the wiper blade 10 through up to 15°. In a direction 70 facing toward the wiper lip 72, the maximum pivot angle is 2°. The retention spring 66 has a stop element 84 (cf. FIG. 3). The stop element 84 is provided to limit the rotational redirection of the wiper blade 10 relative to the wiper arm 14 and/or the wiper arm adapter 38. The stop element 84 contacts in abutment the wiper arm adapter 38.

The adapter unit 12 has an actuation element 60. The actuation element 60 is provided to unlock the coupling between the wiper arm 14 and wiper arm adapter 38. The wiper arm adapter 38 has a wiper arm receiving member 62. The wiper arm receiving member 62 is provided to receive a portion of the wiper arm 14. The wiper arm receiving member 62 is provided to receive an end of the wiper arm 14. In order to form a connection between the wiper arm 14 and the adapter unit 12, the wiper arm 14 is introduced into the wiper arm receiving member 62 in the main extent direction 54. The wiper arm receiving member 62 and the wiper arm 14 have positive-locking elements (not shown) to form a clip-fit connection between the wiper arm 14 and adapter unit 12. An actuation of the actuation element 60 cancels the positive-locking connection and enables the wiper arm 14 to be pulled out of the wiper arm receiving member 62. The wiper blade 10 and the adapter unit 12 are constructed as a single coherent component which is replaced completely when the wiper blade 10 is changed. The wiper arm adapter 38 has a housing 82. The housing 82 has an aerodynamic outer shape. The aerodynamic outer shape is optimized for the flow of air from a direction parallel with the rotation axis 68.

Figure 2:
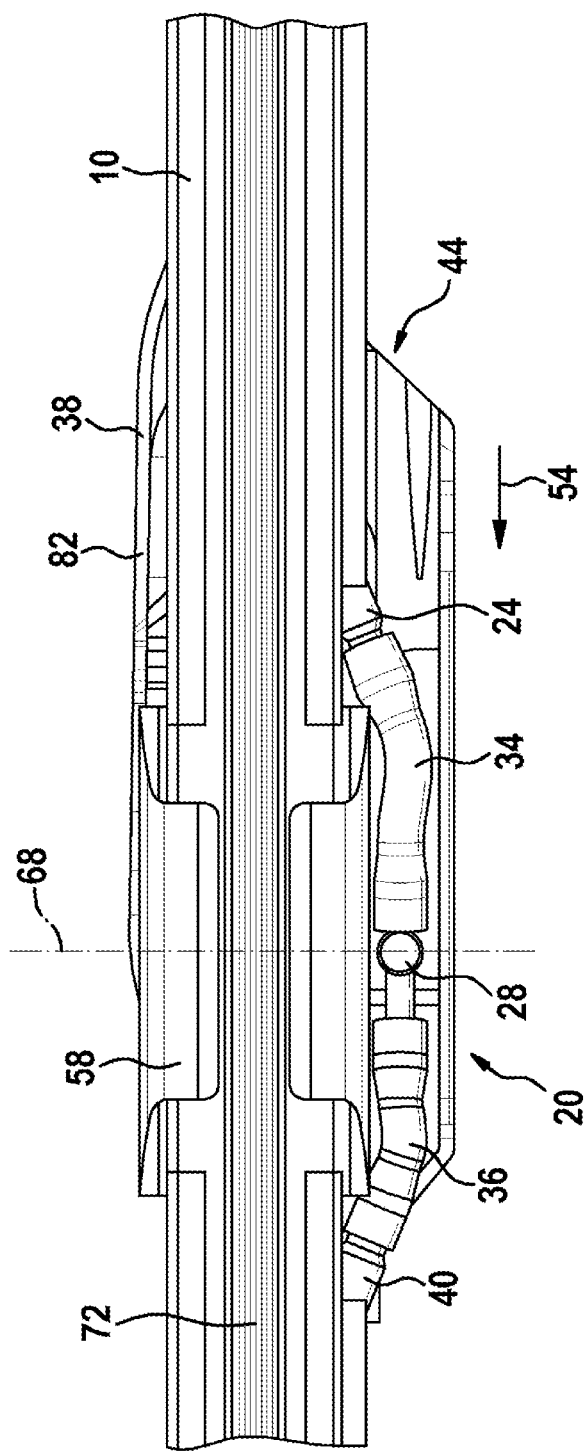
FIG. 2 is a schematic view of the wiper blade device from below.

FIG. 2 is a bottom view of the wiper blade device. The wiper blade 10 has the wiper lip 72. The wiper lip 72 is provided, in the event of a wiping operation, to form touching contact with a windshield which is intended to be wiped. The wiper blade device has a washing water distributor unit 20. The washing water distributor unit 20 is provided for a passage of a fluid, for example, washing water. The washing water distributor unit 20 is provided to supply washing water to the spray unit 18.

Figure 3:
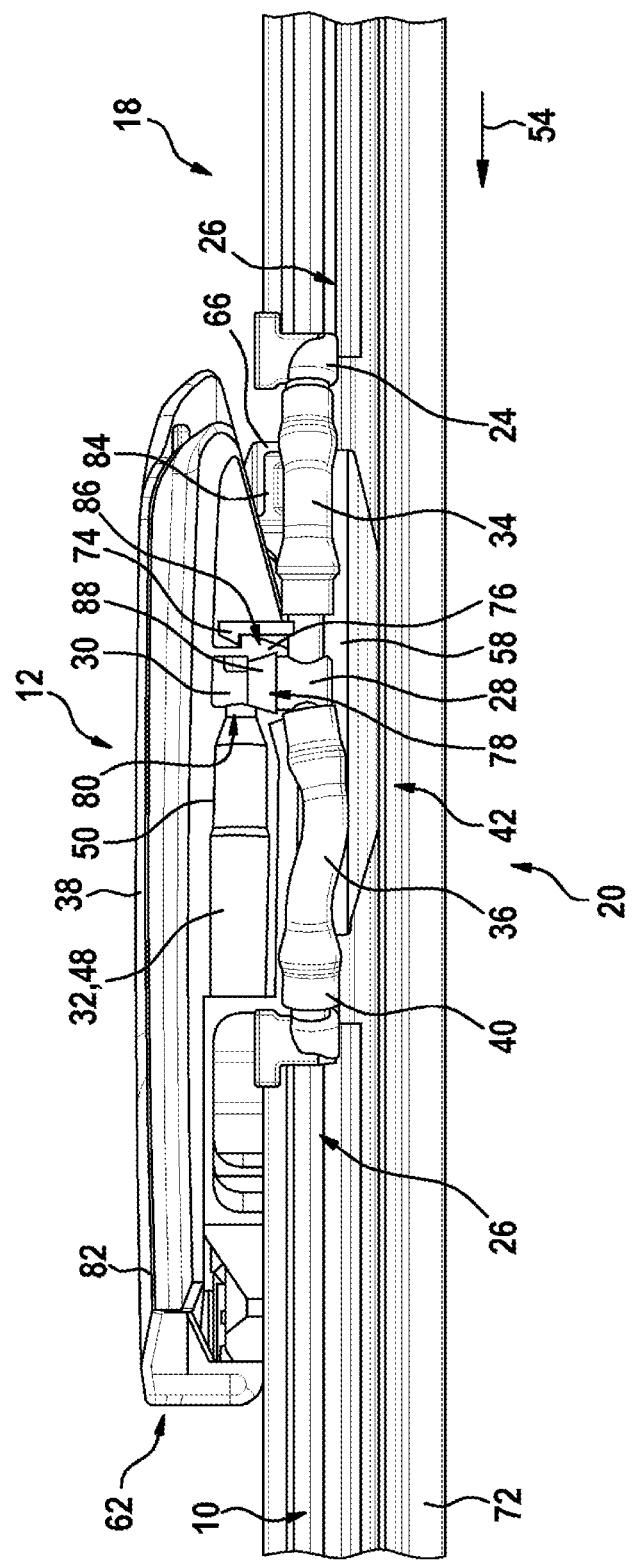
FIG. 3 is a schematic, partially sectioned view of the wiper blade device.

FIG. 3 is a lateral partially sectioned view of the wiper blade device. The wiper blade 10 and the adapter unit 12 are illustrated in section. The washing water distributor unit 20 is not illustrated in section. The washing water distributor unit 20 has a channel coupling element 24 and an additional channel coupling element 40. The channel coupling elements 24, 40 are provided for coupling a component of the washing water distributor unit 20 to a washing water channel 26 of the spray unit 18 in a fluid-conducting manner (cf. also FIG. 1). The washing water channel 26 of the spray unit 18 connects the nozzle elements 22. Washing water is guided to the nozzle elements 22 by means of the washing water channel 26 of the spray unit 18. The washing water channel 26 of the spray unit 18 is integrated in the wiper blade 10. The wiper blade 10 has two washing water channels 26, one at each side of the adapter unit 12. The channel coupling elements 24, 40 form a fluid-tight coupling for guiding washing water. The channel coupling elements 24, 40 are supported so as to be able to be moved relative to the wiper arm adapter 38.

The washing water distributor unit 20 has an adapter coupling element 28. The adapter coupling element 28 forms a fluid-tight coupling for guiding washing water. The adapter coupling element 28 is provided for coupling an additional component of the washing water distributor unit 20 to an additional washing water channel 30 of the adapter unit 12 in a fluid-conducting manner. The adapter coupling element 28 is inserted into an opening 78 of the additional washing water channel 30. The adapter coupling element 28 has a sealing element 88. The sealing element 88 of the adapter coupling element 28 is constructed as a sealing edge. The sealing element 88 of the adapter coupling element 28 is constructed in a mushroom-like manner. The sealing element 88 of the adapter coupling element 28 is constructed as a mushroom-like tapering of an opening of the adapter coupling element 28 at the wiper arm adapter side. The sealing element 88 of the adapter coupling element 28 is provided for water-tight coupling to the additional washing water channel 30 of the adapter unit 12. The sealing element 88 of the adapter coupling element 28 is inserted into a vertical opening of the additional washing water channel 30 of the adapter unit 12. The additional washing water channel 30 of the adapter unit 12 has at an inner side a wall surface which corresponds to the sealing element 88 of the adapter coupling element 28 and by means of which the sealing element 88 of the adapter coupling element 28 is compressed during assembly.

The adapter coupling element 28 has a locking device 86. The locking device 86 is provided to position the adapter coupling element 28 relative to the adapter unit 12. The adapter coupling element 28 has a locking element 74. The locking device 86 has a locking element 74. The locking device 86 is provided to fix the adapter coupling element 28 in the additional washing water channel 30 of the adapter unit 12. The locking device 86 prevents the adapter coupling element 28 from being pressed out of the additional washing water channel 30 of the adapter unit 12 as a result of expansion of washing water in the event of the washing water freezing. The locking element 74 is constructed as a locking hook. The wiper arm adapter 38 has a corresponding locking element 76. The corresponding locking element 76 is constructed as a locking hook. The locking element 74 and the corresponding locking element 76 engage in each other. The adapter coupling element 28 is fixed in position on the wiper arm adapter 38 by means of the locking element 74. The adapter coupling element 28 is connected in a rotationally secure manner to the wiper arm adapter 38.

The washing water distributor unit 20 has a flexible washing water line 34. The flexible washing water line 34 is provided to enable a rotation of the wiper blade 10 about the rotation axis 68. The flexible washing water line 34 is arranged between the channel coupling element 24 and the adapter coupling element 28. The flexible washing water line 34 connects the channel coupling element 24 to the adapter coupling element 28. The flexible washing water line 34 is connected to the adapter coupling element 28 in a fluid-tight manner. The flexible washing water line 34 is connected to the channel coupling element 24 in a fluid-tight manner. The washing water distributor unit 20 has an additional flexible washing water line 36. The additional flexible washing water line 36 is arranged between the additional channel coupling element 40 and the adapter coupling element 28. The additional flexible washing water line 36 connects the additional channel coupling element 40 to the adapter coupling element 28. The additional flexible washing water line 36 is connected to the adapter coupling element 28 in a fluid-tight manner. The additional flexible washing water line 36 is connected to the additional channel coupling element 40 in a fluid-tight manner.

The washing water distributor unit 20 has a washing water distributor element 42. The washing water distributor element 42 is constructed integrally. The washing water distributor element 42 is constructed as a multi-colored injection-molded component. The washing water distributor element 42 is constructed as a two-color injection-molded component. The flexible washing water lines 34, 36 are injected in a rubber-like manner. The adapter coupling element 28 is injected in the manner of hard plastics material. The channel coupling elements 24, 40 are injected in the manner of hard plastics material. The channel coupling element 24 and the flexible washing water line 34 form a portion of the washing water distributor element 42. The channel coupling element 24 and the flexible washing water line 34 are constructed integrally relative to each other. The adapter coupling element 28 forms a portion of the washing water distributor element 42. The adapter coupling element 28 is constructed integrally with the flexible washing water line 34. The additional flexible washing water line 36 forms a component of the washing water distributor element 42. The adapter coupling element 28 is constructed integrally with the additional flexible washing water line 36. The additional channel coupling element 40 forms a portion of the washing water distributor element 42. The additional channel coupling element 40 is constructed integrally with the additional flexible washing water line 36. Alternatively, at least the flexible washing water line 34 and/or the additional flexible washing water line 36 may be constructed separately from the adapter coupling element 28 and/or the channel coupling elements 24, 40. For example, at least one of the flexible washing water lines 34, 36 could be constructed as a separate rubber hose which can be fitted to hose connection pieces of the adapter coupling element 28 and/or the channel coupling elements 24, 40.

The additional washing water channel 30 is partially formed by the adapter unit 12. The additional washing water channel 30 is formed as a hollow space in the adapter unit 12. The additional washing water channel 30 is formed partially by the wiper arm adapter 38. The additional washing water channel 30 is constructed as a hollow space in the wiper arm adapter 38. The additional washing water channel 30 is constructed integrally with the adapter unit 12. The additional washing water channel 30 is constructed integrally with the wiper arm adapter 38. The additional washing water channel 30 has an additional opening 80. The additional opening 80 of the additional washing water channel 30 is arranged at a 90 degree angle relative to the opening 78 of the additional washing water channel 30.

The washing water distributor unit 20 has a washing water supply line channel 32. The washing water supply line channel 32 is arranged to be angled with respect to the additional washing water channel 30 of the adapter unit 12. An angle between the additional washing water channel 30 of the adapter unit 12 and the washing water supply line channel 32 is 90°. The washing water supply line channel 32 is at least partially formed by the adapter unit 12. The washing water supply line channel 32 is formed integrally with the adapter unit 12. The washing water supply line channel 32 is formed integrally with the wiper arm adapter 38. The washing water supply line channel 32 is connected to the additional washing water channel 30 by means of the additional opening 80. The washing water supply line channel 32 extends at least substantially parallel with the main extent direction 54 of the wiper blade 10. The washing water supply line channel 32 has at an end opposite the additional opening 80 for the additional washing water channel 30 a receiving opening for receiving an external washing water supply line 46 (cf. FIG. 4). The washing water supply line channel 32 is tapered in the direction of the additional opening 80 toward the additional washing water channel 30.

The washing water distributor unit 20 has a flow direction in which, during a spray operation of the spray unit 18, washing water flows through the washing water distributor unit 20. The washing water supply line channel 32 is arranged in the flow direction upstream of the additional washing water channel 30, the adapter coupling element 28, the channel coupling elements 24, 40 and the spray unit 18 or the washing water channels 26 of the spray unit 18. The additional washing water channel 30 is arranged in the flow direction upstream of the adapter coupling element 28, the channel coupling elements 24, 40 and the spray unit 18 or the washing water channels 26 of the spray unit 18. The channel coupling elements 24, 40 are arranged in the flow direction upstream of the spray unit 18 or the washing water channels 26 of the spray unit 18.

Figure 4:
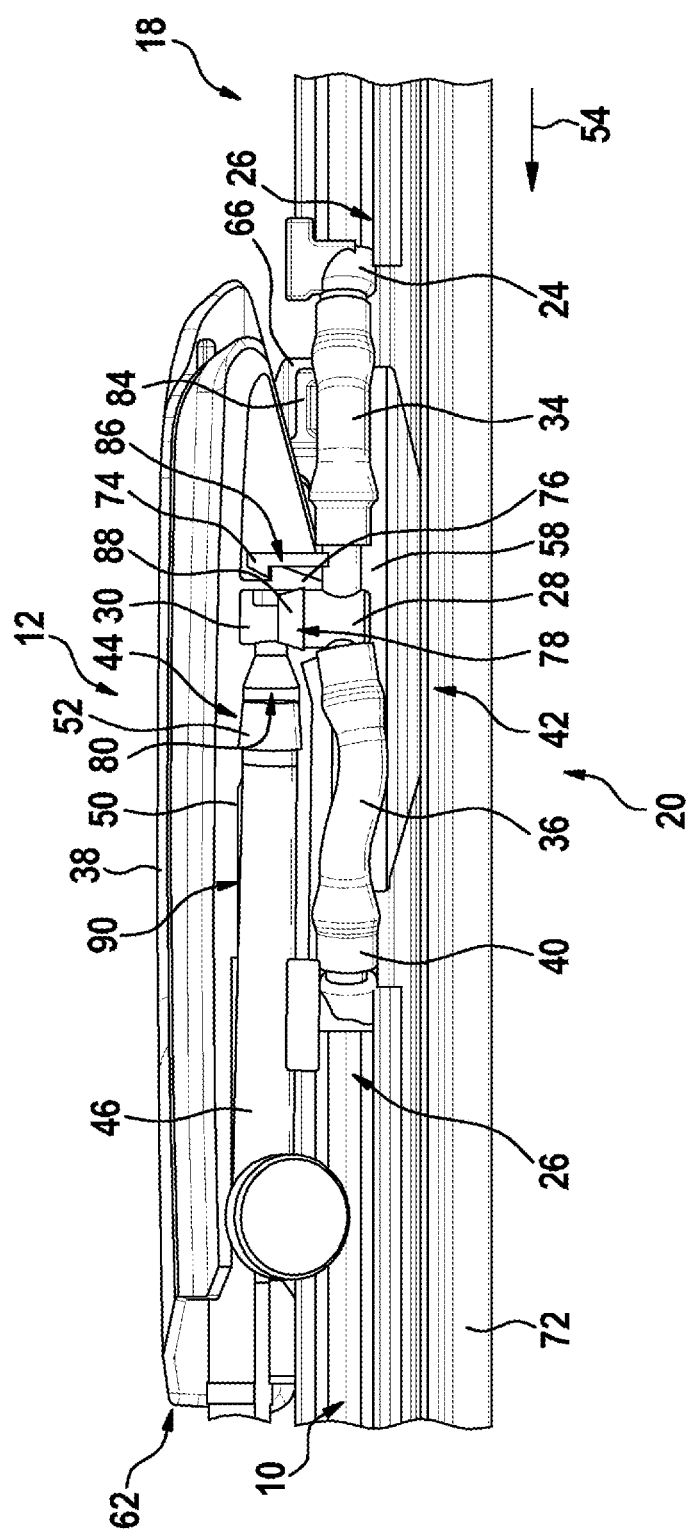
FIG. 4 is a schematic, partially sectioned view of the wiper blade device with an inserted external washing water supply line.

FIG. 4 shows the wiper blade device with an external washing water supply line 46 introduced into the washing water supply line channel 32. The washing water distributor unit 20 has a rapid coupling device 44. The rapid coupling device 44 is constructed without hoses. The rapid coupling device 44 is provided for fluid-tight coupling of the washing water distributor unit 20 to the external washing water supply line 46. The rapid coupling device 44 is provided for fluid-tight coupling of the washing water supply line channel 32 to the external washing water supply line 46. The wiper arm 14 has the external washing water supply line 46. The external washing water supply line 46 is constructed as a rigid pipe. The external washing water supply line 46 is coupled to the wiper arm 14. The external washing water supply line 46 is arranged on the wiper arm 14 so as to be fixed in position relative to the wiper arm 14. The coupling of the external washing water supply line 46 to the wiper arm 14 is releasable. A connection of the wiper arm 14 to the adapter unit 12 at the same time leads to a coupling of the rapid coupling device 44.

The rapid coupling device 44 has a receiving channel 48. The receiving channel 48 is provided for receiving the external washing water supply line 46 of the wiper arm 14. The receiving channel 48 is identical to the washing water supply line channel 32. When the wiper arm 14 is mounted with the wiper blade 10, the external washing water supply line 46 is introduced into the receiving channel 48 or the washing water supply line channel 32 by means of lateral insertion in the main extent direction 54. The receiving channel 48 has an inclined introduction member 50. The inclined introduction member 50 is provided to support a positioning of the external washing water supply line 46 relative to the adapter unit 12. The receiving channel 48 forms an assembly rail 90. The assembly rail 90 serves to support the assembly of the wiper blade 10 on the wiper arm 14. The assembly rail 90 is provided to predetermine and/or guide a movement for inserting the wiper arm 14 in the adapter unit 12. The assembly rail 90 facilitates a lateral insertion of the wiper arm 14 in the wiper arm receiving member 62 and/or the external washing water supply line 46 in the receiving channel 48.

The wiper arm adapter 38 comprises a clip-fit connection (not shown) for connection to the wiper arm 14. The clip-fit connection is provided to predetermine an introduction depth for the external washing water supply line 46 of the wiper arm 14 in the receiving channel 48. The rapid coupling device 44 is free from an additional clip-fit connection. A closure of the clip-fit connection determines a position of the external washing water supply line 46 in the receiving channel 48. The length and/or the optimum introduction depth of the external washing water supply line 46 are coordinated with an introduction depth of the wiper arm 14 in the wiper arm receiving member 62.

The external washing water supply line 46 has a sealing element 52. The sealing element 52 of the external washing water supply line 46 is constructed as a sealing edge. The sealing element 52 of the external washing water supply line 46 is constructed in a mushroom-like manner. The sealing element 52 of the external washing water supply line 46 is constructed as a mushroom-like tapering of an end of the external washing water supply line 46. The sealing element 52 of the external washing water supply line 46 is provided for water-tight coupling to the receiving channel 48. The sealing element 52 of the external washing water supply line 46 is inserted into the receiving channel 48 tapered by the inclined introduction member 50, in particular by means of a lateral sliding movement. The additional receiving channel 48 has at an inner side a wall surface which corresponds to the sealing element 52 of the external washing water supply line 46 and by means of which the sealing element 88 of the adapter coupling element 28 is compressed during assembly.

In a connection by means of the rapid coupling device 44, the sealing element 52 of the external washing water supply line 46 is compressed with the inclined introduction member 50 of the receiving channel 48. When coupling by means of the rapid coupling device 44, the receiving channel 48 can be connected by means of the sealing element 52 of the external washing water supply line 46 in a water-tight manner to the external washing water supply line 46. When the wiper arm 14 is released from the adapter unit 12 by means of the clip-fit connection, at the same time the water-tight connection of the rapid coupling device 44 is separated.

What is claimed is:

1. A wiper blade device comprising
at least one wiper blade (10) that extends along a longitudinal main extent direction (54),
at least one adapter unit (12) for coupling the wiper blade (10) to a wiper arm (14) of a wiper (16), wherein the adapter unit (12) has a wiper arm adapter (38),
at least one spray unit (18) which is integrated in the wiper blade (10), wherein the spray unit (18) includes a first washing water channel (26) extending along the longitudinal main extent direction (54) within the wiper blade (10) and a second washing water channel (26) extending along the longitudinal main extent direction (54) within the wiper blade (10), wherein the adapter unit (12) is disposed between the first washing water channel (26) and the second washing water channel (26) along the longitudinal main extent direction (54), and
at least one washing water distributor unit (20) for supplying washing water to the spray unit (18),
wherein the washing water distributor unit (20) has a first flexible water washing line (34) configured to direct washing water to the first washing water channel (26) and a second flexible water washing line (36) configured to direct washing water to the second washing water channel (26), wherein the washing water distributor unit (20) includes a channel coupling element (24) that couples the first washing water channel (26) to the first flexible water washing line (36), wherein the washing water distributor unit (20) also includes an adapter coupling element (28) that couples the first flexible water washing line (34) to the second flexible water washing line (36), wherein the adapter coupling element (28) is located between the first flexible water washing line (34) and the second flexible water washing line (36) along the longitudinal main extent direction (54), wherein the adapter coupling element (28) is further coupled to an additional washing water channel (30) of the adapter unit (12), and
wherein the additional washing water channel (30) is at least partially formed by the wiper arm adapter (38) of the adapter unit (12).

2. The wiper blade device as claimed in claim 1, characterized in that the adapter unit (12) in a mounted state is connected to the wiper blade (10) at least substantially in a non-detachable manner.

3. The wiper blade device as claimed in claim 1, characterized in that the washing water distributor unit (20) has a washing water supply line channel (32) which is formed integrally with the adapter unit (12), and which is arranged in an angled manner with respect to the additional washing water channel (30) of the adapter unit (12).

4. The wiper blade device as claimed in claim 1, characterized in that the adapter coupling element (28) has a sealing element (88) to form a water-tight coupling at least with the additional washing water channel (30) of the adapter unit (12).

5. The wiper blade device as claimed in claim 4, wherein the sealing element (88) has a mushroom shape, and extends through a vertical opening of the additional washing water channel (30).

6. The wiper blade device as claimed in claim 1, characterized in that the adapter coupling element (28) has a locking device (86) for positioning the adapter coupling element (28) relative to the adapter unit (12).

7. The wiper blade device as claimed in claim 6, characterized in that at least one locking element (74) of the locking device (86) is configured to fix the adapter coupling element (28) in the additional washing water channel (30) of the adapter unit (12).

8. The wiper blade device as claimed in claim 1, characterized in that the wiper arm adapter (38) is configured for coupling to the wiper arm (14) and is connected to the adapter coupling element (28) in a rotationally secure manner.

9. The wiper blade device as claimed in claim 1, characterized in that the wiper arm adapter (38) is configured for coupling to the wiper arm (14), wherein the at least one channel coupling element (24) is configured to be moved relative to the wiper arm adapter (38).

10. The wiper blade device as claimed in claim 1, characterized in that the channel coupling element (24), the adapter coupling element (28), the first flexible washing water line (34), the second flexible washing water line (36) and/or an additional channel coupling element (40) of the washing water distributor unit (20) are constructed as an integral washing water distributor element (42) of the washing water distributor unit (20).

11. The wiper blade device as claimed in claim 10, characterized in that the washing water distributor element (42) is constructed as a multi-colored injection-molded component.

12. The wiper blade device as claimed in claim 1, wherein the washing water distributor unit (20) has a rapid coupling device (44) for a fluid-tight coupling of the washing water distributor unit (20) to an external washing water supply line (46).

13. The wiper blade device as claimed in claim 12, characterized in that the rapid coupling device (44) has at least one receiving channel (48) for receiving an external washing water supply line (46) of the wiper arm (14) of the wiper (16).

14. The wiper blade device as claimed in claim 13, characterized in that the receiving channel (48) has at least one inclined introduction member (50).

15. The wiper blade device as claimed in claim 13, characterized in that, with a coupling by the rapid coupling device (44), the receiving channel (48) is configured to be connected to the external washing water supply line (46) in a water-tight manner by a sealing element (52) of the external washing water supply line (46).

16. The wiper blade device as claimed in claim 13, characterized in that the adapter unit (12) has a wiper arm adapter (38) for coupling to the wiper arm (14) of the wiper (16) which comprises a clip-fit connection for connection to the wiper arm (14), wherein the clip-fit connection is configured to predetermine an introduction depth for an external washing water supply line (46) of the wiper arm (14) in the receiving channel (48).

17. The wiper blade device as claimed in claim 13, characterized in that, with a coupling by means of the rapid coupling device (44), the receiving channel (48) can be connected to the external washing water supply line (46) in a water-tight manner by means of a sealing edge of the external washing water supply line (46).

18. The wiper blade device as claimed in claim 12, wherein the washing water distributor unit (20) has a hose-free, rapid coupling device (44) for a fluid-tight coupling of the washing water distributor unit (20) to an external washing water supply line (46).

19. The wiper blade device as claimed in claim 1, characterized in that the adapter unit (12) in a mounted state is connected to the wiper blade (10) at least substantially in a non-releasable manner.

20. The wiper blade device as claimed in claim 1, characterized in that the adapter coupling element (28) has a sealing edge to form a water-tight coupling at least with the additional washing water channel (30) of the adapter unit (12).

21. The wiper blade device as claimed in claim 1, wherein the adapter coupling element (28) is coupled to the additional washing water channel (30) along a direction that is perpendicular to the longitudinal main extent direction (54).

22. The wiper blade device as claimed in claim 1, wherein the spray nozzle unit (18) includes nozzle elements (22) which are arranged at least substantially parallel with the longitudinal main extent direction (54) of the wiper blade (10) along the wiper blade (10).

* * * * *